United States Patent
Beuch et al.

(10) Patent No.: US 11,334,575 B2
(45) Date of Patent: May 17, 2022

(54) INTEGRATING RELATIONAL DATABASE TEMPORAL TABLES WITH A DISTRIBUTED PROGRAMMING ENVIRONMENT

(71) Applicant: International Business Machines Corporation, Armonk, NY (US)

(72) Inventors: Daniel Beuch, Rochester, MN (US); Michael J. Branson, Rochester, MN (US); John M. Santosuosso, Rochester, MN (US); Eric L. Barsness, Pine Island, MN (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 16/262,417

(22) Filed: Jan. 30, 2019

(65) Prior Publication Data

US 2020/0242122 A1 Jul. 30, 2020

(51) Int. Cl.
*G06F 16/00* (2019.01)
*G06F 16/2457* (2019.01)
(Continued)

(52) U.S. Cl.
CPC ........ *G06F 16/24578* (2019.01); *G06F 16/63* (2019.01); *G06F 16/7328* (2019.01)

(58) Field of Classification Search
CPC .................................................. G06F 16/7328
See application file for complete search history.

(56) References Cited

U.S. PATENT DOCUMENTS

| | | | |
|---|---|---|---|
| 7,046,742 B2 | 5/2006 | Milton | |
| 2014/0358926 A1* | 12/2014 | McGregor | G16H 50/20 707/737 |

(Continued)

FOREIGN PATENT DOCUMENTS

WO 201664377 A1 4/2016

OTHER PUBLICATIONS

Liangjie Hong, Byron Dom, Siva Gurumurthy, and Kostas Tsioutsiouliklis, "A Time-Dependent Topic Model for Multiple Text Streams," KDD 2011 Proceedings of the 17th ACM SIGKDD International Conference on Knowledge Discovery and Data Mining, pp. 832-840.

Siripen Pongpaichet, Vivek K. Singh, Mingyan Gao, and Ramesh Jain, "Eventshop: Recognizing Situations in Web Data Streams," WWW 2013 Companion Proceedings of the 22nd International Conference on World Wide Web, pp. 1359-1368.

(Continued)

*Primary Examiner* — Ajith Jacob
(74) *Attorney, Agent, or Firm* — Patterson + Sheridan, LLP (57) ABSTRACT

Certain aspects of the present disclosure provide techniques for identifying temporal data in data streams to create a temporal database for a stream(s) application to query for temporal data. An example technique includes receiving streams of data at a streams engine and processing the streams of data according to a priority order. The streams engine identifies whether the database is a temporal database and identifies temporal data in each stream of data based on frame analysis, natural language processing techniques, metadata, and optical character recognition. Further, the streams engine generates context data corresponding to the temporal data. The streams engine generates a temporal data record based on the temporal data and context data, and the streams engine generates a reliability factor. The temporal data record and reliability factor are stored in the temporal database for a stream application to query regarding temporal information at a later point in time.

20 Claims, 6 Drawing Sheets (51) Int. Cl.
  *G06F 16/63* (2019.01)
  *G06F 16/732* (2019.01)

(56) References Cited

U.S. PATENT DOCUMENTS

2017/0238055 A1* 8/2017 Chang .................. G11B 27/031
                                                                    725/19
2017/0311559 A1  11/2017 Ebert et al.
2017/0339202 A1  11/2017 Zhou et al.
2020/0253542 A1* 8/2020 Myllymaki ........ A61B 5/02438

OTHER PUBLICATIONS

Junghoon Lee, Gyung-Leen Park, Yumin Cho, Suna Kim, and Jiwon Jung, "Spatio-Temporal Analysis of State-of-Charge Streams for Electric Vehicles," IPSN 2015 Proceedings of the 14th International Conference on Information Processing in Sensor Networks, pp. 368-369.

Ida Mele, Seyed Ali Bahrainian, and Fabio Crestani, "Linking News Across Multiple Streams for Timeliness Analysis," CIKM '17 Proceedings of the 2017 ACM on Conference on Information and Knowledge Management, pp. 767-776.

Philip S. Kurtin, and Marco J.G. Bekooij, "Temporal Analysis of Static Priority Preemptive Scheduled Cyclic Streaming Applications using CSDF Models," ESTIMedia 2016 Proceedings of the 14th ACM/IEEE Symposium on Embedded Systems for Real-Time Multimedia, pp. 94-103.

* cited by examiner

INTEGRATING RELATIONAL DATABASE TEMPORAL TABLES WITH A DISTRIBUTED PROGRAMMING ENVIRONMENT

BACKGROUND

The present invention relates to streaming applications, and more specifically, to a streams engine identifying temporal data in streaming data and creating a temporal database of the identified temporal data.

A stream, or streams, application typically has large amounts of data flowing through an arrangement of processing elements, as specified by an operator graph. In a stream application, a sequence of data elements (e.g., tuples) flow into the stream application via a source operator from various sources such as electronic sensors, files, or the output of another data source. The source operator processes each data element according to the logic of that operator. Once processed, the data is sent to the next operator(s) of the stream application for additional processing as per the logic. specified in the respective operator.

As the data is processed, the data is inserted into tables of a database. For example, processed tuples can be stored in a temporal table, which includes a base table and a history table. The processed tuples are stored in the base table, replacing previously stored tuples in the base table, which in turn are stored in the history table. The arrangement of the temporal table supported by a database allows a user to query a database as it was in the past, is in the present, or will be in the future.

However, when a stream application processes data in a stream of data, inherent temporal data can be missed if the stream application does not have the logic built into the application for processing the inherent temporal data from the stream of data. As such, with inherent temporal data missing, the temporal analysis of the stream of data is incomplete, resulting in an incomplete answer to a query from a stream application to the database about the past, present, or future state of data in the database.

Currently, embodiments describe methods of performing temporal analysis by building in the logic to the stream application or utilizing a backend database for "outside" temporal analysis. However, existing methods are unable to account for the inherent temporal data without building in the logic to the stream application. Further, existing methods do not utilize a temporal database for data queries in a distributed programming environment.

SUMMARY

According to one embodiment of the present invention, a method, system, and computer program product for creating a temporal database of temporal data identified by a streams engine, the method: identifying a data stream from a data source; parsing elements of the data stream to identify temporal data, wherein temporal data includes: temporal objects; or temporal facts; generating context data corresponding to the temporal data; generating a record of the temporal data and the corresponding context data; and storing the record of the temporal data and the corresponding context data in the temporal database.

The following descriptions and the related drawings set forth in detail certain illustrative features of one or more embodiments.

BRIEF DESCRIPTION OF THE SEVERAL VIEWS OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide methods, processing systems, and computer readable mediums for identifying temporal data in a stream of data for temporal analysis by a stream application without the stream application having to include such logic in the stream application itself. In one embodiment, a stream engine identifies temporal data inherent in a data stream and stores the temporal data in a temporal database. Data stored in the temporal database can be leveraged to provide a more complete answer to database queries.

In one embodiment, the streams engine receives a stream of data from a data source. The stream of data can include text data, audio data, or video data. The streams engine processes the stream of data from the data source according to the ranking of the stream of data in the priority order of processing. Further, the streams engine identifies a temporal database. Based on the identification of the temporal database, the streams engine identifies temporal data in the stream of data from the data source by parsing elements of the stream of data for temporal data, such as temporal objects or temporal facts. For example, the streams engine can identify through frame analysis a temporal object, such as a clock on a wall in a video. Further, the streams engine can extract a temporal fact from the clock in the background of the video otherwise depicting two people talking and determine the then-current time the two people are talking or use the time from the clock as a reference to what the people discuss in audio data corresponding to the video data. In another example, the streams engine can perform natural language processing upon audio data to identify temporal facts spoken in the audio data, such as "Today is Monday" or "Yesterday was the $15^{th}$."

In addition to identifying temporal data, the streams engine can generate context data corresponding to the temporal data indicating the context from which temporal data is identified in the stream of data. For example, the context data can include the speaker of the temporal data, the object on which temporal data is identified, the location of temporal data in the stream of data, as well as metadata associated with the stream of data that can provide further context to the temporal data identified in the stream of data.

The streams engine can generate a record of the temporal data and corresponding context data to store in the temporal database. Further, the streams engine may calculate a reliability factor associated with the record, indicating how accurate the temporal data is based on the data source of the stream of data. For example, if the data source of a stream of data is an established financial news source, then the reliability factor calculated is higher in comparison to if the data source is an anonymous social media account. Once the record of temporal data and context data is generated and reliability factor is calculated for the record, both can be stored in the temporal database. The streams engine can then monitor the temporal database to determine any trends or patterns in the temporal data. Based on the monitoring, the streams engine can update the ranking of a stream of data in the priority order of processing the streams of data. In some cases, if a pattern is identified by the streams engine, the streams engine can update the ranking of the stream of data to be processed first from the data source. In other cases, the streams engine can receive a query from a stream application regarding temporal data stored in the temporal database. Upon receiving the request, the streams engine can retrieve the requested temporal data from the temporal database and send the temporal data to the stream application.

Figure 1:
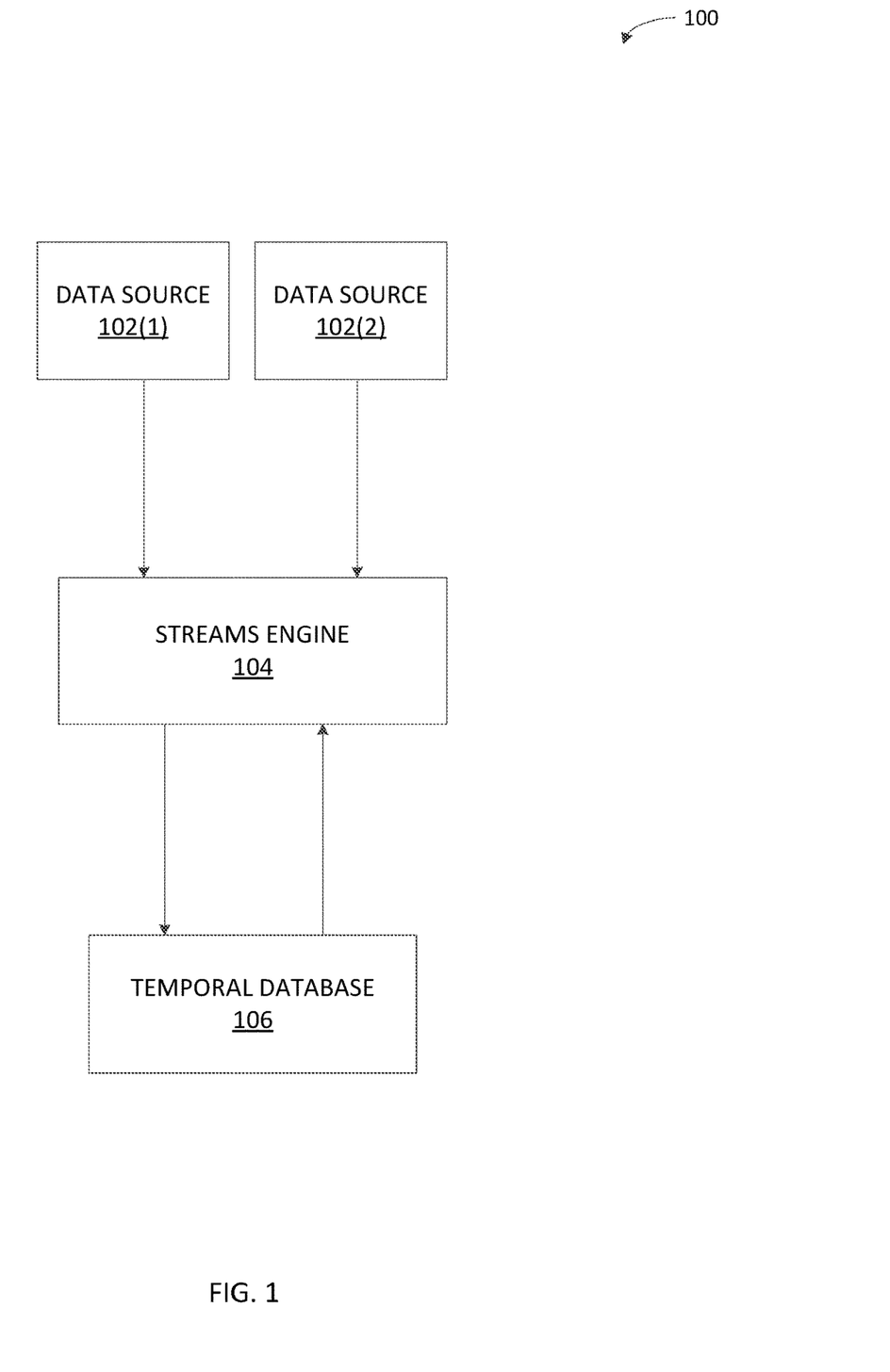
FIG. 1 depicts a distributed programming environment for a streams engine to identify temporal data, according to one embodiment of the present disclosure.

FIG. 1 depicts a distributed programming environment 100 for a streams engine to identify temporal data. As shown, the distributed programming environment 100 includes data sources 102, such as a first data source 102(1) and a second data source 102(2), a streams engine 104, and a temporal database 106. In the distributed programming environment 100, a streams engine 104 identifies inherent temporal data from streams of data for temporal analysis by a stream application without the stream application including such logic for identifying temporal data.

The streams engine 104 receives a data stream from a data source 102. Data streams are continuous flows of data from a data source 102, such as a sensor, an input/output device, or a data feed from a web log. The data streams may include, but are not limited to text data, video data, and audio data. The streams engine 104 processes each data stream received from data sources 102 in a priority order according to a ranking associated with each data stream. Further, the streams engine 104 identifies temporal data inherent in the data streams including temporal objects and temporal facts. For example, the streams engine 104 can identify temporal data in a video frame by analyzing the frame for temporal objects such as clocks, calendars, countdowns, or any such object indicating a temporal fact like a date or a time. In another example, the streams engine 104 can identify temporal data in audio data by analyzing the audio, via natural language processing, to identify temporal facts such as references to a date, time, year, season, or a relative point in time. In another example, the streams engine 104 can identify temporal data based on text in video data by analyzing the text, via optical character recognition, to identify temporal facts such as "Monday" or "01/01/2019" in the text.

In addition to identifying temporal data in the data streams received from data source(s) 102, the streams engine 104 generates context data. The context data indicates the context of the data stream from which the temporal data is identified. For example, in a video data stream, temporal data can be identified through frame analysis as 10:30 AM. The context data can include the object from which the temporal data is identified (e.g., a clock), the location of the temporal object (e.g., the clock is on a table next to a door) based on frame analysis, as well as metadata from the video data stream to identify, for example, a time stamp of when the video data stream recorded the temporal data and GPS coordinates indicating where the video data stream is recorded. In some cases, the context data can include the identity of the speaker of a temporal fact or to whom or what the temporal fact is referring to based on natural language processing of an audio data stream.

Parallel to the processing of the data stream for identifying temporal data and generating context data, the streams engine 104 identifies whether the backend database is a temporal database. The temporal database 106 is a database comprised of temporal tables (e.g., a base table and history tables). Data is stored in the base table and as new data is stored in the base table, the data previously stored in the base table is moved to a history table.

Once the streams engine 104 identifies the temporal data and generates context data, a temporal data record is generated by the streams engine 104 of the temporal data and corresponding context data. Along with generating a temporal data record for the temporal data and corresponding context data, the streams engine 104 may determine a reliability factor associated with each data source 102. Generally, such a factor indicates how accurate the temporal data is from the data source 102. In some cases, the streams engine 104 determines the reliability factor based on metadata associated with the data source 102. For example, the metadata can indicate the identity of the data source 102, and the identity of the data source 102 can be used to calculate a reliability factor. The streams engine 104 stores the reliability factor in the temporal database 106 with the corresponding temporal data record.

The streams engine 104 also monitors the temporal database 106 as temporal data records are added to the temporal database 106. As described above, the new temporal data records are stored in the base table, and any previously stored data records are moved to the history table. The streams engine 104 identifies patterns in the temporal database 106. Based on a given pattern, the streams engine 104 may reprioritize the order of processing data streams from data sources 102. For example, the ranking of a data stream in the priority order of processing can be moved up (or down) in the priority order of processing depending on the pattern identified.

In some case, the streams engine can receive a query from a stream application regarding temporal data stored in the temporal database (not depicted). The streams engine can retrieve such temporal data from the temporal database and send the temporal data to the stream application.

Figure 2:
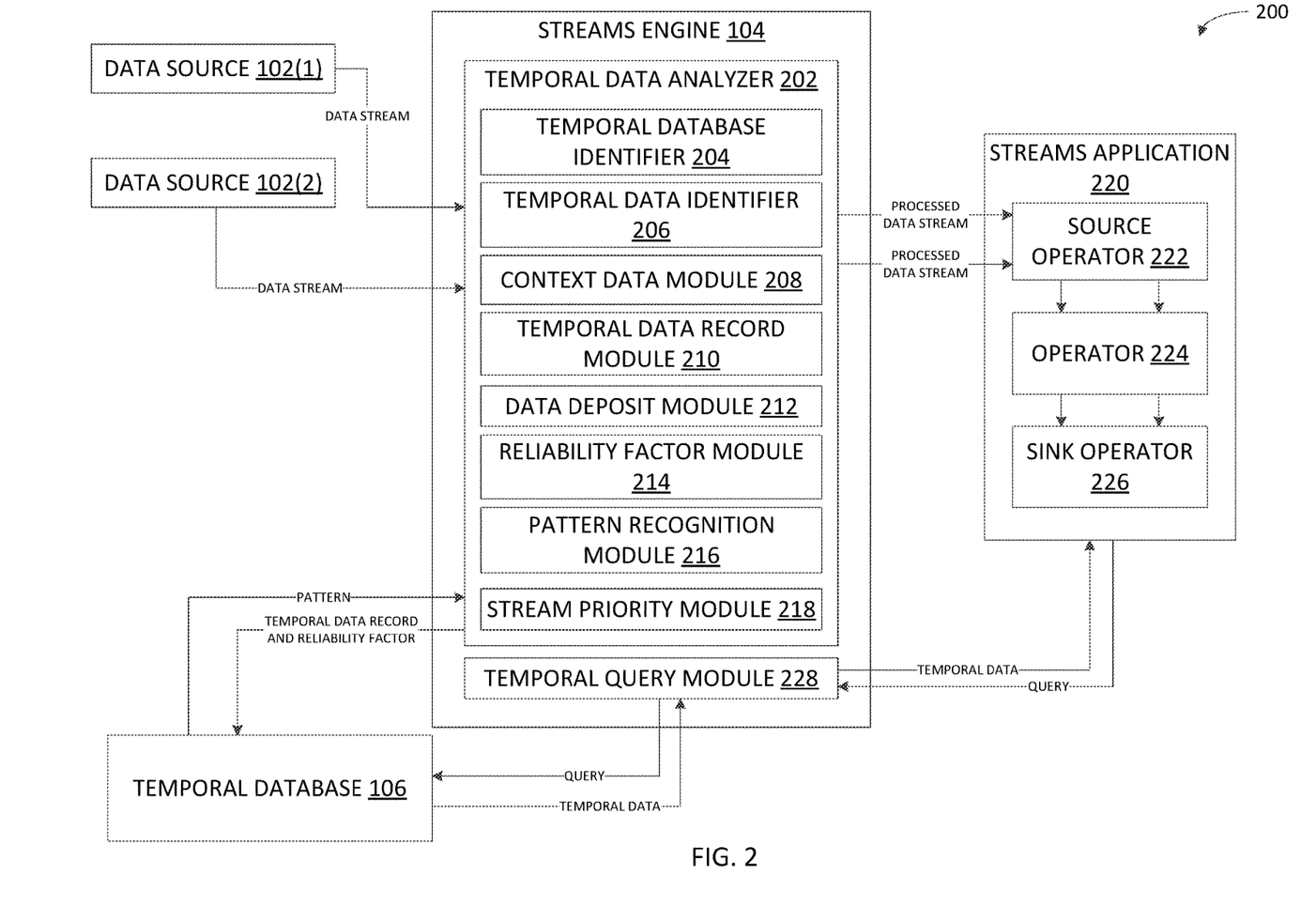
FIG. 2 depicts data flowing within the distributed programming environment, according to one embodiment of the present disclosure.

FIG. 2 depicts data 200 flowing within the distributed programming environment. As shown, the streams engine 104 receives a continuous flow of data from data sources 102. The data streams received by the streams engine 104 are processed by a temporal data analyzer 202 in a priority order. The temporal data analyzer 202 identifies a temporal database 106, identifies temporal data from each data stream, generates context data associated with the temporal data, generates a temporal data record, stores the temporal data record in the temporal database 106, calculates reliability factors associated with each data stream and identified temporal data, identifies patterns in the temporal database

106 of the temporal data and reliability factors, and re-prioritizes processing of data streams according to the identification of patterns in the temporal database 106. In order to do such processing and analysis, the temporal data analyzer 202 includes a temporal database identifier 204, a temporal data identifier 206, a context data module 208, a temporal data record module 210, a data deposit module 212, a reliability factor module 214, a pattern recognition module 216, and a stream priority module 218.

The temporal database identifier 204 identifies whether the backend database is a temporal database 106. In cases where a temporal database 106 is identified, the temporal data identified by the temporal data identifier 206 can be stored in the temporal database 106 as a temporal data record. As a result, by storing temporal data in a temporal database 106, there can be a more complete picture associated with the data stream when temporal data is requested by a stream application.

The temporal data identifier 206 identifies temporal data from the data stream. In some cases, if the data stream is video data, the streams engine 104 can process each frame of video to identify temporal objects or temporal facts. For example, the streams engine 104 can determine through frame analysis there is a clock (e.g., temporal object) in a frame of a video indicating the time is 2:00 pm Eastern time (e.g., temporal fact).

In other cases, the streams engine 104 can determine from audio data, based on natural language processing, that a speaker of the audio data stated "Today is Wednesday" in reference to the day when the audio data was captured. Of course, the particular features evaluated by the streams engine 104 may be tailored as needed or based on the content or properties of a given data stream.

The context data module 208 generates the context data associated with temporal data identified by the temporal data identifier 206. For example, the context data module 208 can identify temporal objects from which a temporal fact is identified, such as a clock or a calendar and generate context data indicating from which temporal object the temporal fact is identified. In another example, the context data module 208 can identify the location where temporal data is spoken based on metadata of the audio streaming data that includes GPS coordinates of where the audio streaming data originates. The context data module 208 can generate context data indicating the temporal data corresponds to a set of GPS coordinates.

The temporal data record module 210 generates a temporal data record for each temporal data identified in the data stream by the temporal data identifier 206. The temporal data record includes the identified temporal data and corresponding context data. Further, temporal data record can correspond to a reliability factor generated by the reliability factor module 214.

The data deposit module 212 stores temporal data records and corresponding reliability factors in a temporal database. Each temporal data record can be stored as a new row in the temporal database. In some cases, the temporal data record can be stored in the base table of the temporal database, replacing a previously stored temporal data record. The previously stored temporal data record in such instances can be stored in the history table.

As described, the temporal data record can correspond to a reliability factor. The reliability factor is calculated by the reliability factor module 214 and is indicative of how reliable the temporal data record is from a particular data source 102. In some cases, the reliability factor module 214 calculates the reliability factor based on metadata tracking the data source 102 associated with the temporal data record. In such cases, the metadata can indicate the source of the streaming data and the quality of the streaming data (e.g., quality of sound, video). For example, the reliability factor of a temporal data record associated with a data stream from a high-resolution news video feed from a verified news agency can have a higher reliability factor in comparison to a temporal data record associated with a data stream from an unverified social media video post from an anonymous source.

The pattern recognition module 216 identifies patterns in the temporal data and reliability factors stored in the temporal database 106 by monitoring the temporal database 106. In some cases, if the pattern recognition module 216 identifies a pattern in the temporal data, a signal can be triggered to the stream priority module 218 to re-prioritize the order in which data streams are processed.

For example, assume the streams engine 104 manages stock market data by first processing a live feed of data generated from a web log of a stock market analyst (e.g., a streaming pod cast) and later processing a live feed of stock market tracking data. After the pattern recognition module 216 identifies a pattern in stock market trading based on the temporal data records added to the temporal database, the stream priority module 218 can re-prioritize the order in which data is processed. In some cases, the priority order can be based on the reliability factor and any identified patterns. In the current example, upon determining a pattern, the feed of the stock market tracking data with a higher reliability factor is processed first and then the live feed of data from the stock market analyst.

Once the data streams are processed by the streams engine 104, the data streams are further processed by a source operator 222 of a stream(s) application 220. The stream application 220 is typically represented by a set of operators connected to one another in an operator graph that defines how the data stream is processed. For example, as depicted, the stream application 220 comprises a source operator 222, an operator 224, and a sink operator 226. Each operator in the stream application 220 receives one or more data streams as input and processes each data stream to produce one or more data streams. The source operator 222 receives the data from external sources and reads the external data into the stream application 220. The operator 224 processes the data stream from the source operator 222.

In some cases, the operator 224 can filter, aggregate, merge, transform, or perform complex mathematical functions on the data stream. The sink operator 226 of the stream application 220 receives a data stream and configures the tuples of the data stream to an output format. Further, as depicted, the stream application 220 can query the temporal database 106 by sending the query to the streams engine 104. The temporal query module 228 of the streams engine 104 receives the query from the stream application 220 and retrieves the temporal data from the temporal database 106 that corresponds to the query. The temporal query module 228 sends the temporal data to the stream application 220 in response to the query, which provides a "complete" picture of the data stream.

Figure 3:
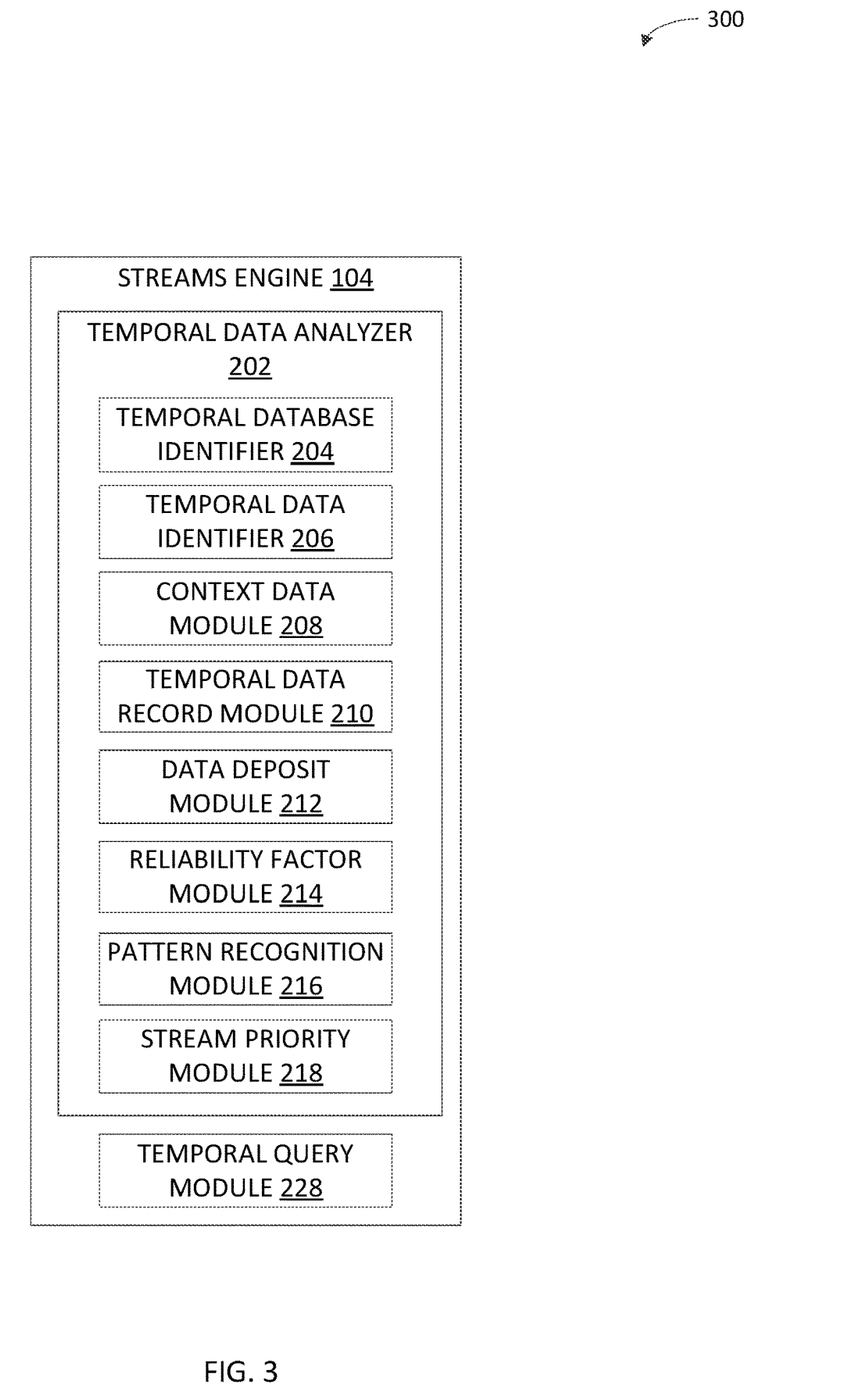
FIG. 3 depicts a streams engine for identifying temporal data from data streams, according to one embodiment of the present disclosure.

FIG. 3 depicts a streams engine 300 for identifying temporal data from data streams. As depicted, a streams engine 104 comprises a temporal data analyzer 202, which includes a temporal database identifier 204, a temporal data identifier 206, a context data module 208, a temporal data record module 210, a data deposit module 212, a reliability factor module 214, pattern recognition module 216, and a stream priority module 218. Further, in some cases, the streams engine 104 can include a temporal query module 228.

As described above, the temporal database identifier 204 determines whether the backend database is a temporal database. The identification and use of a temporal database assists in temporal analysis because the temporal database stores current data in a base table and previously stored data in a history table instead of discarding the previously stored data like databases without temporal tables.

The temporal data identifier 206 identifies temporal data from the data stream by analyzing the data for temporal objects and facts. In a video stream, the temporal data identifier 206 can analyze each video frame to identify temporal objects such as clocks and calendars. The temporal data identifier 206 can also identify temporal facts in each video frame. For example, the temporal data identifier 206 can identify the date written on a white board or a time displayed on a computer monitor. In an audio stream, the temporal data identifier 206 can analyze the audio data to identify temporal facts including dates, times, days of the week, months of the year, and relative temporal terms (e.g., "tomorrow" and "yesterday").

Once the temporal data is identified by the temporal data identifier 206, the context data module 208 generates context data corresponding to the temporal data indicating the context in which the temporal data is identified. For example, the context data can include the location where the temporal data identified, the time the temporal data is recorded, the time the temporal data is identified, or the speaker associated with temporal data. The temporal data record module 210 generates temporal data records comprising temporal data and corresponding context data. The data deposit module 212 deposits the temporal data record generated by the temporal data record module 210 into the identified temporal database. The data deposit module 212 also deposits reliability factors generated by the reliability factor module 214. The reliability factor is an indication of how accurate the temporal data is from the data stream. In some cases, the reliability factor can be determined based on metadata associated with source of the data stream, such as identity of the source of the data stream and the quality of the data stream.

As the data deposit module 212 deposits the temporal data record into the temporal database, the pattern recognition module 216 of the streams engine 104 identifies any patterns or trends in the data deposited to the temporal database (e.g., temporal data record or reliability score). Based on a pattern being detected, the pattern recognition module 216 can signal the stream priority module 218 to re-prioritize the order in which the data streams are processed by the streams engine.

Further, the streams engine 104 can include a temporal query module 228. The temporal query module 228 can receive a query from a stream application. Based on the query received, the temporal query module 228 can retrieve temporal data from the temporal database and send the retrieved temporal data to the stream application.

Figure 4:
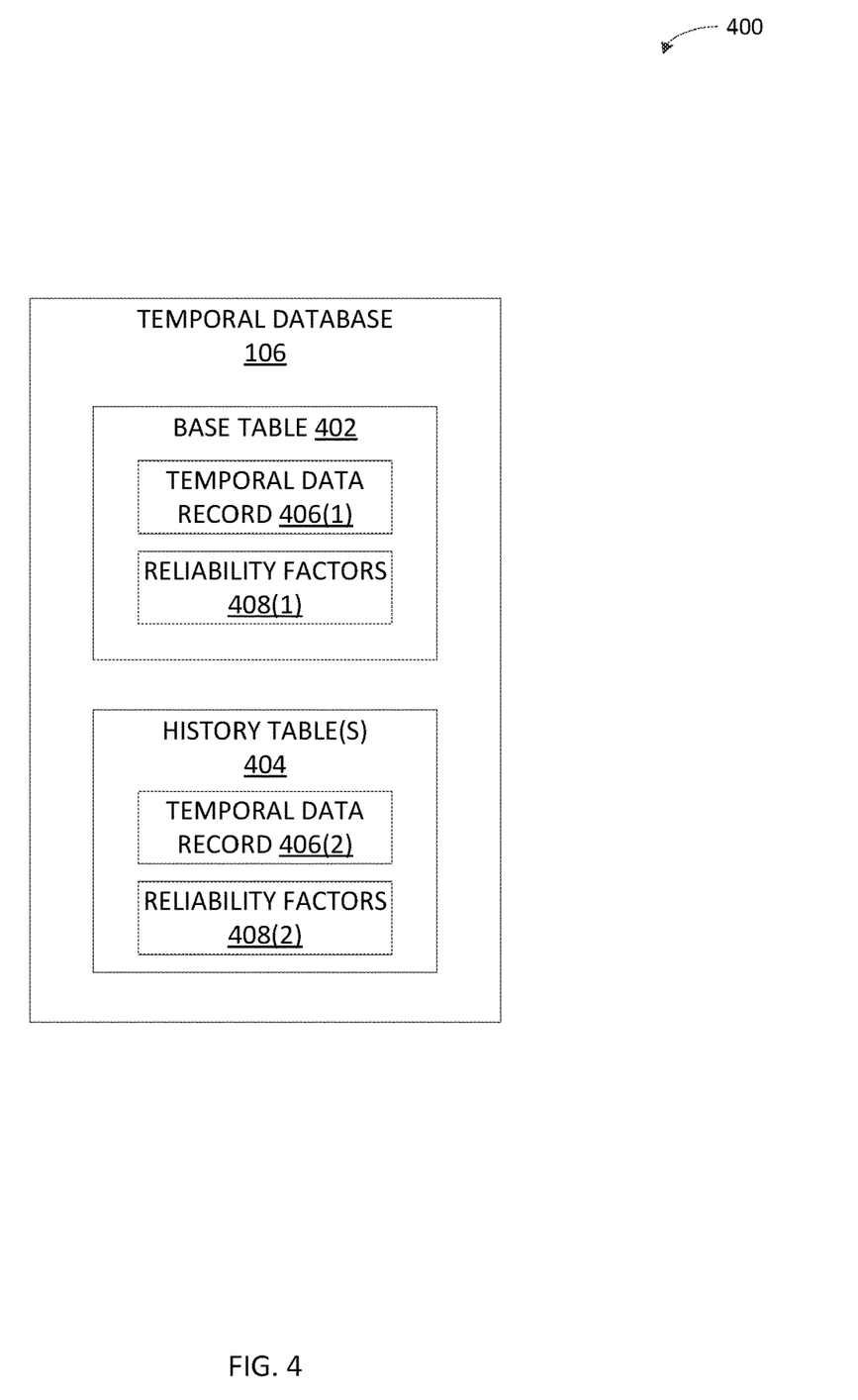
FIG. 4 depicts a temporal database for storing temporal data and reliability factors associated with data streams, according to one embodiment of the present disclosure.

FIG. 4 depicts a temporal database 400 for storing temporal data records and reliability factors associated with data streams. As depicted, a temporal database 106 comprises a base table 402 and history table(s) 404. In some cases, when a first temporal data record 406(1) and reliability factor 408(1) are received by the temporal database 106, the first temporal data record 406(1) and reliability factor 408(1) are stored in the base table 402.

As the streams engine processes data streams to identify new temporal data and generate a new temporal data record to replace the first temporal data record 406(1) in the base table 402, the first temporal data record 406(1) and corresponding reliability factor 408(1) are moved to history table(s) 404 and stored as second temporal data record 406(2) and reliability factor 408(2). A stream application can then send a query about temporal data in the temporal database 106 to the streams engine regarding data stored in the temporal database 106 at different points in time. The streams engine, in turn, can retrieve temporal data record(s) corresponding to the query from the temporal database 106. The streams engine can then provide the temporal data record(s) to the stream application for further processing.

Figure 5:
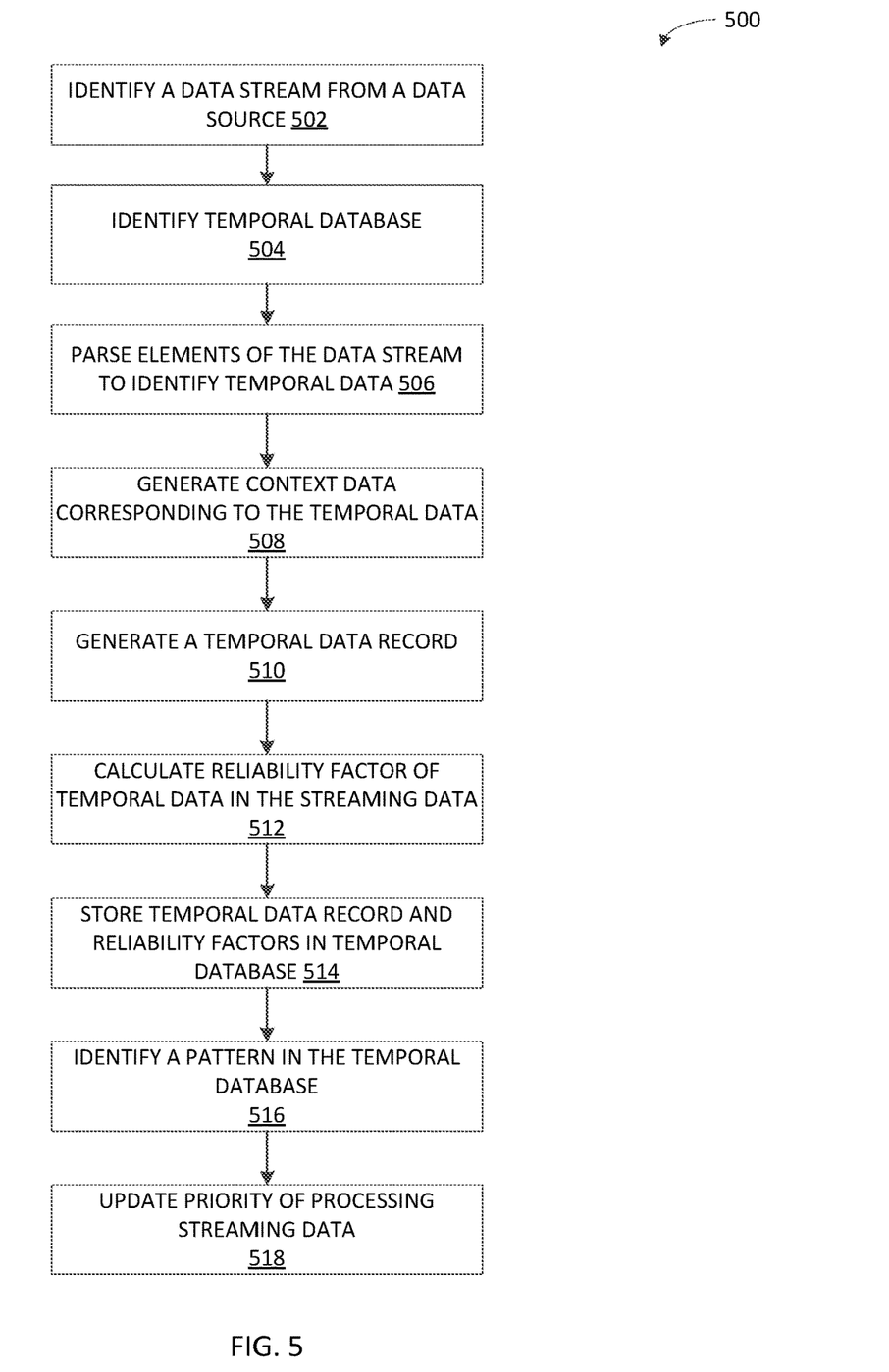
FIG. 5 depicts a method of identifying temporal data in a distributed programming environment, according to one embodiment of the present disclosure.

FIG. 5 depicts a method 500 for identifying temporal data in a distributed programming environment.

As depicted, the method 500 begins at step 502 where a data stream from a data source is identified. For example, the streams engine can identify stock market data of real-time stock prices from a New York Stock Exchange data feed and a live video feed from the stock market floor of the London Stock Exchange. In some cases, the streams of data identified from one or more data sources are processed in a priority order.

At step 504, a temporal database is identified. For example, the streams engine can identify the backend database is a temporal database that includes a base table and history tables.

At step 506, elements of the data stream are parsed to identify temporal data. For example, the streams engine can identify temporal objects or temporal facts from the streaming data based on metadata associated with the streaming data, frame analysis, or natural language processing of the streaming data. Temporal objects include clocks, watches, calendars, and other objects indicative of temporal facts. Temporal facts include temporal references such as the time, date, month, season, and relative points in time. The streams engine can identify time stamps from the stock market data indicating the time associated with the stock price. The streams engine can identify temporal data in the live video feed such as the clock at the stock market exchange through frame analysis of the video.

At step 508, context data corresponding to the temporal data is generated. For example, the streams engine can generate context data based on the clock where the temporal data is identified from and the location of the clock on a wall at the stock market exchange.

At step 510, a temporal data record is generated. Each temporal data record generated includes the temporal data identified in the streaming data and corresponding context data to indicate, for example, where and when the temporal data was identified.

At step 512, a reliability factor is calculated for the temporal data record. A reliability factor is calculated indicating how accurate the temporal data record is that was identified in streaming data. The calculation can be based on at least, for example, context data or metadata indicating the quality of the video and the source of the streaming data. For example, the stock market data from the New York Stock Exchange can have a higher reliability factor because the streams engine is able to more accurately identify temporal data in comparison to the live video feed from the London Stock Exchange which is captured, in this example, at a distance using older camera.

At step 514, the temporal data record and the corresponding reliability factor is stored in a temporal database. In some cases, the temporal data record and corresponding reliability factor is stored in a new row of the base table. In other cases, if there is a temporal data record already in a row of the base table, such data record is replaced and moved to a history table. At step 516, a pattern is identified in the temporal data or reliability factors stored in the temporal database, based on monitoring the temporal database.

At step 518, upon identifying a pattern or trend in the temporal database, the priority of processing each stream of data is updated. For example, the streams engine can identify an increase in reference to a particular stock in the real-time stock prices in the New York Stock Exchange at the end of the trading day. Based on the increased reference, the streams engine can re-prioritize the processing of the data streams to first process the live feed from the London Stock Exchange which opens before the New York Stock Exchange and includes the particular stock.

In some cases (not depicted), the streams application can query the streams engine for temporal data stored in the temporal database. The streams engine, upon receiving such query, can retrieve the respective temporal data record and send the temporal data to the streams engine.

Figure 6:
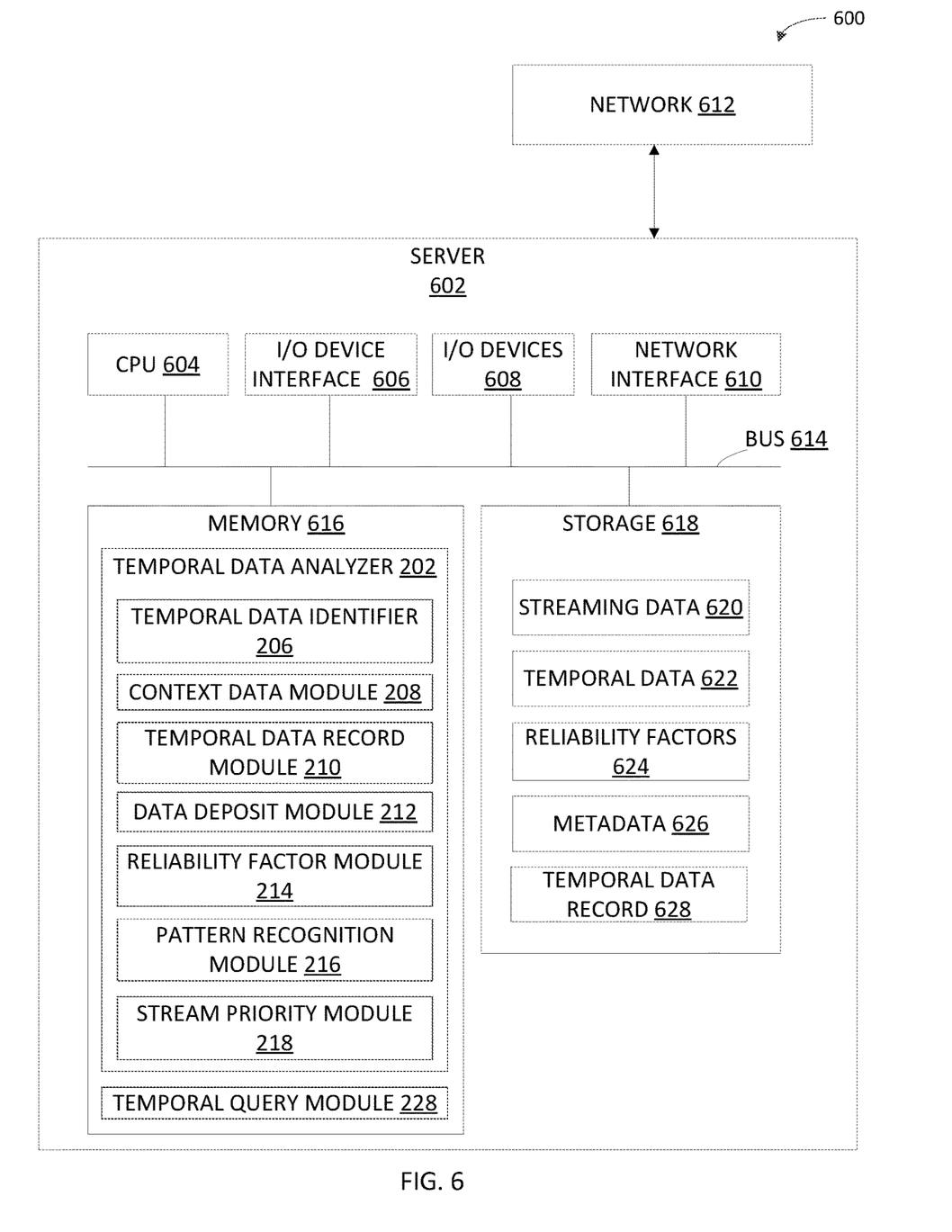
FIG. 6 depicts a server for processing data streams and identifying temporal data, according to one embodiment of the present disclosure.

FIG. 6 depicts a server 600 for processing data streams and identifying temporal data.

As illustrated, the server 602 includes a CPU 604 connected to a data bus 614. CPU 604 is configured to process computer-executable instructions, e.g., stored in memory 616 or storage 618, and to cause server 602 to perform methods described herein in FIGS. 1-5. CPU 604 is included to be representative of a single CPU, multiple CPUs, or a single CPU having multiple processing cores, and other forms of processing architecture capable of executing computer-executable instructions.

Server 602 further includes input/output (I/O) device interface 606, which allows the server 602 to interface with I/O devices 608, such as keyboards, mouse devices, pen input, and other devices that allow for interaction with server 602. Note that while not depicted with independent external I/O devices 608, server 602 can connect with external I/O devices 608 through physical and wireless connections.

Server 602 further includes network interface 610, which allows the server 602 to communicate with other devices via network 612.

Server 602 further includes memory 616. As depicted, memory 616 includes a temporal data analyzer 202 and a temporal query module 228. As described, the temporal data analyzer 202 can include a temporal database identifier 204, a temporal data identifier 206, context data module 208, a temporal data record module 210, a data deposit module 212, a reliability factor module 214, a pattern recognition module 216, and a stream priority module 218 as described in FIGS. 2-3. Note that while shown as a single memory 616 in FIG. 6 for simplicity, the various aspects stored in memory 616 can be stored in different memories, but all accessible by CPU 604.

Server 602 further includes storage 618, which in the example depicted can store streaming data 620, temporal data 622, reliability factors 624, metadata 626, and temporal data record(s) 628. As with memory 616, a single storage 618 is depicted in FIG. 6 for simplicity, but the various aspects stored in storage 618 may be stored in different storages, but all accessible by CPU 604 via internal connections, such as data bus 614, or external connection, such as network interface 610. Although shown as a single unit, storage 618 may be a combination of fixed and/or removable storage devices, such as fixed disc drives, removable memory cards, optical storage, SSD or flash memory devices, network attached storage (NAS), or connections to a storage area-network (SAN) devices.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet.

In context of the present invention, a user may access applications (e.g., stream applications) or related data available in the cloud. For example, the streams engine could execute on a computing system in the cloud and identify temporal data from the streams of data without a stream application having to build in such logic for identifying temporal data within the stream application. In such a case, the streams engine could identify temporal data from the streams of data received from the data sources and store the identified temporal data at a temporal database storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method for creating a temporal database of temporal data identified by a streams engine, the method comprising:
   identifying a data stream from a data source;
   parsing elements of the data stream to identify a temporal object within the data stream and a time presented by the temporal object in the data stream;
   generating context data indicating the temporal object and a location of the temporal object;
   generating a record of the temporal object, the time presented by the temporal object, and the context data;
   generating a reliability score for the generated record, wherein the reliability score indicates an accuracy of the time presented by the temporal object;
   storing the generated record and the reliability score in a temporal database; and
   updating a ranking in a priority order for processing the data stream based on the reliability score.

2. The method of claim 1, further comprising:
   receiving a query from a stream application;
   retrieving, from the temporal database, the generated record in response to the query; and
   providing, to the stream application, the generated record in response to the query.

3. The method of claim 1, further comprising processing the data stream from the data source according to the priority order.

4. The method of claim 3, wherein the method further comprises:
   identifying a pattern in the temporal database; and
   updating the ranking in the priority order for processing the data stream based on the identified pattern.

5. The method of claim 1, wherein parsing elements of the data stream to identify temporal data comprises:
   analyzing each frame in the data stream to identify the temporal object in the frame;
   analyzing audio data in the data stream for the time presented by the temporal object; or
   analyzing text data in the data stream for the time presented by the temporal object.

6. The method of claim 1, further comprising upon generating the record, sending the data stream to a stream application.

7. A system, comprising:
   a processor; and
   a memory storing instructions which when executed by the processor perform a method for creating a temporal database of temporal data identified by a streams engine, the method comprising:
      identifying a data stream from a data source;
      parsing elements of the data stream to identify a temporal object within the data stream and a time presented by the temporal object in the data stream;
      generating context data indicating the temporal object and a location of the temporal object;
      generating a record of the temporal object, the time presented by the temporal object, and the context data;
      generating a reliability score for the generated record, wherein the reliability score indicates an accuracy of the time presented by the temporal object;
      storing the generated record and the reliability score in a temporal database; and
      updating a ranking in a priority order for processing the data stream based on the reliability score.

8. The system of claim 7, wherein the method further comprises:
   receiving a query from a stream application;
   retrieving, from the temporal database, the generated record in response to the query; and
   providing, to the stream application, the generated record in response to the query.

9. The system of claim 7, wherein the method further comprises processing the data stream from the data source according to the priority order.

10. The system of claim 9, wherein the method further comprises:
    identifying a pattern in the temporal database; and
    updating the ranking in the priority order for processing the data stream based on the identified pattern.

11. The system of claim 7, wherein parsing elements of the data stream to identify temporal data comprises:
    analyzing each frame in the data stream to identify the temporal object in the frame;
    analyzing audio data in the data stream for the time presented by the temporal object; or
    analyzing text data in the data stream for the time presented by the temporal object.

12. The system of claim 7, wherein the method further comprises upon generating the record, processing the data stream via a stream application.

13. A computer program product for creating a temporal database of temporal data identified by a streams engine, the computer program product comprising:
    a computer-readable storage medium having computer-readable program code embodied therewith, the computer-readable program code executable by one or more computer processors to:
       identify a data stream from a data source;
       parse elements of the data stream to identify a temporal object within the data stream and a time presented by the temporal object in the data stream;
       generate context data indicating the temporal object and a location of the temporal object;
       generate a record of the temporal object, the time presented by the temporal object, and the context data;
       generate a reliability score for the generated record, wherein the reliability score indicates an accuracy of the time presented by the temporal object;
       store the generated record and the reliability score in a temporal database; and
       update a ranking in a priority order for processing the data stream based on the reliability score.

14. The computer program product of claim 13, wherein the computer-readable program code is further executed to:
    receiving a query from a stream application;
    retrieving, from the temporal database, the generated record in response to the query; and
    providing, to the stream application, the generated record in response to the query.

15. The computer program product of claim 13, wherein the computer-readable program code is further executed to process the data stream from the data source according to the priority order.

16. The computer program product of claim 13, wherein parsing elements of the data stream to identify temporal data comprises:
- analyzing each frame in the data stream to identify the temporal object in the frame;
- analyzing audio data in the data stream for the time presented by the temporal object; or
- analyzing text data in the data stream for the time presented by the temporal object.

17. The computer program product of claim 15, wherein the computer-readable program code is further executed to:
- identify a pattern in the temporal database; and
- update the ranking in the priority order for processing the data stream based on the identified pattern.

18. The method of claim 1, wherein generating the reliability score comprises:
- accessing metadata associated with the data source; and
- determining an identify of the data source from the metadata.

19. The system of claim 7, wherein generating the reliability score comprises:
- accessing metadata associated with the data source; and
- determining an identify of the data source from the metadata.

20. The computer program product of claim 13, wherein generating the reliability score comprises:
- accessing metadata associated with the data source; and
- determining an identify of the data source from the metadata.

* * * * *